(12) United States Patent
Tanimoto

(10) Patent No.: US 7,286,553 B2
(45) Date of Patent: Oct. 23, 2007

(54) COMMUNICATION DEVICE AND METHOD FOR CONTROLLING COMMUNICATION DEVICE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1031 days.

(21) Appl. No.: 10/298,383

(22) Filed: Nov. 18, 2002

(65) Prior Publication Data

US 2003/0103492 A1 Jun. 5, 2003

(30) Foreign Application Priority Data

Dec. 4, 2001 (JP) .............................. 2001-369988
Dec. 4, 2001 (JP) .............................. 2001-370332

(51) Int. Cl.
H04L 12/28 (2006.01)

(52) U.S. Cl. .................................. 370/431; 370/395.5

(58) Field of Classification Search ................ 370/431, 370/455, 461, 462, 464, 465, 471, 487, 493–495, 370/395.3, 395.5, 395.31, 401, 395.4, 437
See application file for complete search history.

(56) References Cited

U.S. PATENT DOCUMENTS

| | | | | |
|---|---|---|---|---|
| 6,304,881 | B1 * | 10/2001 | Halim et al. ................ | 707/201 |
| 6,389,005 | B1 * | 5/2002 | Cruickshank ............... | 370/352 |
| 6,570,879 | B1 * | 5/2003 | Kikuchi ................. | 370/395.21 |
| 2002/0087353 | A1 * | 7/2002 | Han ............................. | 705/1 |

FOREIGN PATENT DOCUMENTS

| | | |
|---|---|---|
| JP | 62-189823 | 8/1987 |
| JP | 05-268296 | 10/1993 |
| JP | 11-164116 | 6/1999 |
| JP | 11-177711 | 7/1999 |
| JP | 2000-196843 | 7/2000 |
| JP | 2000-232553 | 8/2000 |
| JP | 2000-295404 | 10/2000 |
| JP | 2001-024869 | 1/2001 |
| JP | 2001-028641 | 1/2001 |
| JP | 2001-119436 | 4/2001 |
| JP | 2001-169079 | 6/2001 |
| JP | 2001-268122 | 9/2001 |
| JP | 2001-285603 | 10/2001 |
| JP | 2001-292293 | 10/2001 |
| JP | 2002-185743 | 6/2002 |
| JP | 2002-190938 | 7/2002 |

* cited by examiner

Primary Examiner—Brenda Pham
(74) Attorney, Agent, or Firm—Hogan & Hartson LLP

(57) ABSTRACT

A communication device includes a communication unit that carries out communications via a plurality communication channels and a plurality of communication protocols and a storage unit storing ability management information that registers a plurality of groups of specifying information for specifying another communication device, a communication channel and a communication protocol used by the other communication device, and identification information used in the communication channel and the communication protocol. The communication device also includes a controller for selecting the communication channel, the communication protocol, and the identification information corresponding to the specifying information of a receiving communication device, from registered information within an ability management table, and for carrying out the communication by the communication unit.

17 Claims, 11 Drawing Sheets

FIG. 2

| TERMINAL NAME | SPECIFYING NUMBER | COMMUNI-CATION CHANNEL | IDENTIFICATION INFORMATION | COMMUNICATION PROTOCOL | RELAY FUNCTION | RECEIVING ABILITY ||||
|---|---|---|---|---|---|---|---|---|---|
| | | | | | | RESOLUTION | MAXIMUM PAPER SIZE | ENCODING METHOD | COLOR |
| COMMUNI-CATION DEVICE 1 | 1111 | PSTN | 075-003-4567 | T.30 | AVAILABLE | 200dpi | A3 | MMR | NOT AVAILABLE |
| | | PBX | 2001 | T.30 | AVAILABLE | 200dpi | A3 | MMR | NOT AVAILABLE |
| | | LAN | ifax1@kasou.net | T.37S | AVAILABLE | 200dpi | A3 | JBIG | NOT AVAILABLE |
| COMMUNI-CATION DEVICE 2 | 2222 | PBX | 2002 | T.30 | AVAILABLE | 200dpi | A3 | JBIG,MMR | NOT AVAILABLE |
| | | PSTN | 075-003-4568 | T.30 | AVAILABLE | 200dpi | A3 | JBIG, MMR | NOT AVAILABLE |
| COMMUNI-CATION DEVICE 3 | 3333 | PSTN | 075-003-4569 | T.30 | AVAILABLE | 400dpi | A3 | MMR | NOT AVAILABLE |
| | | LAN | ifax2@kasou.net | T.37S,T.37F | AVAILABLE | 400dpi | A3 | ZIP | NOT AVAILABLE |
| COMMUNI-CATION DEVICE 4 | 4444 | LAN | 192.168.1.4 | T.38 | NOT AVAILABLE | 400dpi | A3 | GIF | NOT AVAILABLE |
| | | LAN | ifax3@kasou.net | T.37S,T.37F | NOT AVAILABLE | 600dpi | A3 | JBIG | NOT AVAILABLE |
| COMMUNI-CATION DEVICE 5 | 5555 | PSTN | 06-0003-4567 | T.30,BFT | AVAILABLE | 600dpi | B4 | JBIG,MMR | AVAILABLE |
| | | PBX | 2003 | T.30 | AVAILABLE | 600dpi | B4 | JBIG,MMR | AVAILABLE |
| | | LAN | 192.168.1.5 | T.38 | AVAILABLE | 600dpi | B4 | JPEG | AVAILABLE |
| | | LAN | ifax4@kasou.net | T.37S,T.37F | AVAILABLE | 600dpi | B4 | JPEG | AVAILABLE |
| COMMUNI-CATION DEVICE 6 | 6666 | PSTN | 06-0003-4568 | T.30,BFT | NOT AVAILABLE | 600dpi | B4 | JBIG,MMR | AVAILABLE |
| | | LAN | ifax5@kasou.net | T.37S,T.37F | NOT AVAILABLE | 600dpi | B4 | JPEG | AVAILABLE |

FIG. 5

| TERMINAL NAME | SPECIFYING NUMBER | COMMUNI-CATION CHANNEL | IDENTIFICATION INFORMATION | COMMUNICATION PROTOCOL | RELAY FUNCTION | RECEIVING ABILITY ||||
|---|---|---|---|---|---|---|---|---|---|
| | | | | | | RESOLUTION | MAXIMUM PAPER SIZE | ENCODING METHOD | COLOR |
| COMMUNI-CATION DEVICE 201 | 1111 | PSTN | 075-003-4567 | T.30 | AVAILABLE | 200dpi | A3 | MMR | NOT AVAILABLE |
| | | PBX | 2001 | T.30 | AVAILABLE | 200dpi | A3 | MMR | NOT AVAILABLE |
| | | LAN | ifax1@kasou.net | T.37S | AVAILABLE | 200dpi | A3 | JBIG | NOT AVAILABLE |
| COMMUNI-CATION DEVICE 202 | 2222 | PBX | 2002 | T.30 | AVAILABLE | 200dpi | A3 | JBIG,MMR | NOT AVAILABLE |
| | | PSTN | 075-003-4568 | T.30 | AVAILABLE | 200dpi | A3 | JBIG,MMR | NOT AVAILABLE |
| COMMUNI-CATION DEVICE 203 | 3333 | PSTN | 075-003-4569 | T.30 | AVAILABLE | 400dpi | A3 | MMR | NOT AVAILABLE |
| | | LAN | ifax2@kasou.net | T.37S,T.37F | AVAILABLE | 400dpi | A3 | ZIP | NOT AVAILABLE |
| COMMUNI-CATION DEVICE 204 | 4444 | LAN | 192.168.1.4 | T.38 | NOT AVAILABLE | 400dpi | A3 | GIF | NOT AVAILABLE |
| | | | ifax3@kasou.net | T.37S,T.37F | NOT AVAILABLE | 400dpi | A3 | JBIG | NOT AVAILABLE |
| COMMUNI-CATION DEVICE 205 | 5555 | PSTN | 06-0003-4567 | T.30,BFT | AVAILABLE | 600dpi | B4 | JBIG,MMR | AVAILABLE |
| | | PBX | 2003 | T.30 | AVAILABLE | 600dpi | B4 | JBIG,MMR | AVAILABLE |
| | | LAN | 192.168.1.5 | T.38 | AVAILABLE | 600dpi | B4 | JPEG | AVAILABLE |
| | | | ifax4@kasou.net | T.37S,T.37F | AVAILABLE | 600dpi | B4 | JPEG | AVAILABLE |
| COMMUNI-CATION DEVICE 206 | 6666 | PSTN | 06-0003-4568 | T.30,BFT | NOT AVAILABLE | 600dpi | B4 | JBIG,MMR | AVAILABLE |
| | | LAN | ifax5@kasou.net | T.37S,T.37F | NOT AVAILABLE | 600dpi | B4 | JPEG | AVAILABLE |

| NUMBER | DESTINATION | MODE | DATE AND TIME | NUMBER OF PAGES | RESULT | REMARKS |
|---|---|---|---|---|---|---|
| 1 | 2222 | HIGH IMAGE QUALITY | 1/1 8:00 | 1 | OK | |
| 2 | 3333 | HIGH IMAGE QUALITY | 1/1 9:00 | 2 | OK | |
| 3 | 4444 | HIGH IMAGE QUALITY | 1/1 10:00 | 2 | T.4-1 | |
| 4 | G1 | HIGH IMAGE QUALITY | 1/1 11:00 | 3 | OK | BROADCAST |
| 5 | 5555 | HIGH IMAGE QUALITY | 1/1 12:00 | 1 | T.2-1 | |
| 6 | 6666 | HIGH IMAGE QUALITY | 1/1 13:00 | 4 | OK | |

(B)

| DETAILS |
|---|
| PROTOCOL T.30 |
| PROTOCOL T.37S |
| PROTOCOL T.37F NO DELIVERY CONFIRMATION |
| PROTOCOL 7.37S |
| PROTOCOL T.37S NO RESPONSE FROM SERVER |
| PROTOCOL T.30 |

FIG. 7

| ERROR CODE | T.30 | T.37 | T.38 |
|---|---|---|---|
| T.1-1 | DIAL ERROR | MAIL SERVER CONNECTION ERROR | DESTINATION CONNECTION ERROR |
| T.2-1 | DISCONNECT | MAIL SERVER NO RESPONSE | CONNECTION INTERRUPTION |
| T.3-1 | IMAGE DATA TRANSMISSION ERROR | IMAGE DATA FORMAT ERROR | IMAGE DATA TRANSMISSION INTERRUPTION |
| T.4-1 | POST-MESSAGE NO RESPONSE | NO DELIVERY CONFIRMATION | NO RESPONSE |

FIG. 10

| NUMBER | DESTINATION | MODE | DATE AND TIME | NUMBER OF PAGES | RESULTS | REMARKS |
|---|---|---|---|---|---|---|
| 1 | 2222 | HIGH IMAGE QUALITY | 1/1 8:00 | 1 | PBX T.30 OK | |
| 2 | 3333 | HIGH IMAGE QUALITY | 1/1 9:00 | 2 | PSTN T.30 DIAL ERROR | |
| 2 | 3333 | HIGH IMAGE QUALITY | 1/1 9:01 | 2 | LAN T.37S OK | |
| 3 | 4444 | HIGH IMAGE QUALITY | 1/1 10:00 | 2 | LAN T.38 IMAGE DATA TRANSMISSION INTERRUPTED | |
| 3 | 4444 | HIGH IMAGE QUALITY | 1/1 10:01 | 2 | LAN T.37F NO DELIVERY CONFIRMATION | |
| ... | ... | ... | ... | ... | ... | ... |

FIG. 11

```
TERMINAL 1111

COMMUNICATION MANAGEMENT REPORT
```

| NUMBER | DESTINATION | MODE | DATE AND TIME | NUMBER OF PAGES | RESULTS | REMARKS |
|---|---|---|---|---|---|---|
| 1 | 2222 | HIGH IMAGE QUALITY | 1/1 8:00 | 1 | OK | |
| 2 | 3333 | HIGH IMAGE QUALITY | 1/1 9:00 | 2 | OK | |
| 3 | 4444 | HIGH IMAGE QUALITY | 1/1 10:00 | 2 | T.4-1 | |

COMMUNICATION DEVICE AND METHOD FOR CONTROLLING COMMUNICATION DEVICE

BACKGROUND OF THE INVENTION

1. Field of the Invention

The present invention relates to a communication device that uses a plurality of communication channels or a plurality of communication protocols.

2. Description of the Related Art

Recently, communication devices have been provided with multi-functions, and communication channels and communication protocols have been diversified. As a result, communication devices that can use a plurality of communication channels or a plurality of communication protocols are being developed. For example, a conventional facsimile machine only performs a facsimile communication using a PSTN (Public Switched Telephone Network). However, recent facsimile machines can use a PBX (Private Branch Exchange), and further include a LAN (Local Area Network) interface. Therefore, the facsimile machine can communicate with terminals connected to the LAN, or communicate using an intranet connected to the LAN or Internet. In addition, a communication can be carried out using various communication protocols, other than protocols used during the facsimile communication. Various communication protocols include the SMTP (Simple Mail Transfer Protocol), the POP (Post Office Protocol), the HTTP (Hyper Text Transfer Protocol), the VoIP (Voice over IP), or the like, which are used when using the LAN, the Internet, or the like.

Accompanying such diversification of the communication channels and the communication protocols, when specifying a communication device as a receiving communication device, it is necessary to use identification information corresponding to each communication channel or communication protocol. For example, when using the PSTN, the identification information for the receiving communication device is a telephone number. When using the LAN or the Internet, the identification information is the IP (Internet Protocol) address. When transmitting by an electronic mail in particular, the identification information is the electronic mail address. When using the HTTP as the communication protocol, the identification information is the URL (Uniform Resource Locator).

In the conventional communication device that can use a plurality of communication channels or communication protocols, it is necessary to set the communication channel and the communication protocol to be used. In addition, it is necessary to set the identification information for the communication device used as the receiving device according to the set communication channel or the communication protocol. Therefore, in the case where the communication device used as the receiving communication device handles a plurality of communication channels or communication protocols, it is necessary to set different identification information for the same destination. This setting process is extremely complicated. In addition, the user is responsible for selecting which communication channel or communication protocol to use. The user is also required to select the communication channel or the communication protocol each time a communication is carried out. Such an operation is troublesome for the user.

Furthermore, due to such a diversification of the communication channel or the communication protocol, the communication channel and the communication protocol that can be used differs according to the communication device. As a result, the communication cannot be carried out directly with certain communication device used as the receiving communication device. In such a case, conventionally, the communication has to be carried out by searching for another communication device that can carry out the communication directly with the receiving communication device. There are also cases when the communication device was replaced with a communication device that has the ability to carry out the communication directly with the receiving communication device. In addition, it is necessary to purchase a new communication device.

In addition, the general communication device creates and stores communication management information as communication history. When the communication channel and the communication protocol are diversified as mentioned above, the communication management information is also diversified. For example, there are cases when different communication results are shown according to the communication channel used, or according to the communication protocol used. Therefore, when referring to displayed or printed communication management information, different information is referred to according to which communication channel or communication protocol used. Thus, problems arise where the communication management information is extremely complicated and difficult to understand.

SUMMARY OF THE INVENTION

The present invention is made in consideration to the above-mentioned circumstance. It is an advantage of the present invention to provide a communication device that can carry out a communication with a desired communication device without the user carrying out complicated operations, and without the user being conscious about the difference in the communication channel or the communication protocol or the difference in identification information corresponding to such communication channel and communication protocol.

In addition, it is an advantage of the present invention to provide a communication device that can obtain unified communication management information even when the communication is carried out using any one of a plurality of communication channels or communication protocols, in the case a plurality of communication channels and the communication protocols can be used.

The communication device of the present invention includes a communication unit that carries out a communication using a plurality of communication channels and a plurality of communication protocols. In addition, the communication device includes an ability management table that registers a plurality of groups of specifying information for specifying another communication device, communication channel and communication protocol used by the other communication device, and identification information used in the communication channel and the communication protocol. The communication device also includes a controller for selecting the communication channel, the communication protocol, and the identification information corresponding to the specifying information of the receiving communication device from registered information stored in the ability management table, and having the communication carried out by the communication unit.

In the case the receiving communication device includes a plurality of communication channels and a plurality of communication protocols, information can be registered in the ability management table for each of the communication channels and the communication protocols. Then, when carrying out the communication, by designating the specifying information of receiving communication device, information corresponding to the receiving communication device is selected automatically from the registered information stored in the ability management table, and the communication is carried out. Therefore, the user is not required to carry out the setting of the communication channel or the communication protocol, or the setting of the identification information corresponding to the communication channel and the communication protocol. In addition, the user is not required to be conscious about carrying out these settings. The user can carry out the communication just by designating the specifying information of the receiving communication device.

Further, when selecting information from a plurality of registered information, for example, the selection can be made in accordance with a prescribed priority order, or registered information can be selected that is registered with information related to the receiving ability most suitable for the communication. In addition, in the case of failing to end the communication normally as a result of carrying out the communication in accordance with the registered information selected based on a prescribed priority order, the communication can be carried out again by selecting the registered information in the next order based on the prescribed priority order. As a result, even in the case of failing to end the communication normally, retransmission using another communication channel or communication protocol can be carried out without the user being conscious about changing the communication channel or the communication protocol.

Furthermore, in the case the communication unit cannot carry out the communication by the communication channel or the communication protocol communicated by the receiving communication device, another communication device is to be a relay communication device. Further, the other communication device can carry out the communication by the communication unit and the communication channel that can be communicated by the communication means. The other communication device can also carry out the communication by the communication unit and the communication channel that can be communicated by the receiving communication.

The other communication device is searched from the ability management table. Then, the searched relay communication device is indicated to relay the communication to the receiving communication device, and the communication is carried out with the relay communication device. As a result, even in the case the communication cannot be carried out directly to the destination, the relay communication device can be selected automatically, the relay communication device can be indicated to forward the communication, and the communication can be carried out with the relay communication device. As a result, the communication can be carried out with the receiving communication device. The user can carry out the communication with the receiving communication device, which the communication cannot be carried out directly, without being conscious about the relaying carried out.

Thus, according to the present invention, in the communication system that is connected with the communication devices that can carry out the communication by a plurality of communication channels and a plurality of communication protocols, just by designating the receiving communication device at the time of the communication, an appropriate communication channel and communication protocol are selected automatically, and the communication is carried out. As a result, it appears that a plurality of communication devices within the system is operating under the same communication channel and the communication protocol. The user is not required to set the communication channel, the communication protocol, or the like every time. The communication can be carried out with various communication devices just with a simple operation.

In addition, in the case the communication cannot be carried out normally by the selected communication channel and the communication protocol, the communication channel or the communication protocol in the next order is selected automatically, and the communication is carried out. Therefore, the user is not required to carry out complicated operations for communication error.

Furthermore, in the case of the communication with the receiving communication device, to which the communication cannot be carried out directly, or in the case the relay communication are useful, the relay communication device is selected automatically, and the communication is carried out. As a result, operations for determining whether or not to carry out relaying, or the complicated operations relating to the relay communication becomes unnecessary. Thus, according to the present invention, convenience in the communication device can be improved remarkably.

In addition, according to the present invention, the communication device includes a communication unit that can carry out the communication by a plurality of communication channels and a plurality of communication protocols, and a holding unit for holding communication management information. The communication device also includes a controller for controlling the communication via the communication unit, and forming the communication management information for each communication and having the information held by the holding unit. The communication management information includes communication result information that is independent of the communication channel and the communication protocol used during the communication. As a result, even when the user refers to the communication result, the user is not confused with the difference in the notation by the communication channel or the communication protocol, and the user can obtain easily understandable communication management information.

In addition, in the case the communication device includes a function for carrying out re-communication by using an alternative communication channel or communication protocol when the communication using a particular communication channel or communication protocol fails, communication management information can be formed for the first communication and for one or several times of re-communication. Generally, even when any one of the communication channels or the communication protocols is used, the user just needs to know, whether or not the communication has ended normally. There are many cases when it is not necessary for the user to know the history of abnormal communications that are generated before the communication ends normally. Therefore, for the communication management information, even in the case the re-communication is carried out, when the communication has ended normally, the communication result information at that time can be adopted for the communication management information. When the communication has ended abnormally, communication result information can be adopted for the communication management information. Such a communication result information for the abnormal communication can be the communication result for the first communication or the final communication, or the communication result that unifies one or a plurality of communication. As a result, the communication management information that is redundant for the user can be eliminated. In addition, the user can be presented with easier understandable communication management information.

As in the same manner, when the communication with a plurality of destinations is indicated, and the communication is carried out by using a plurality of communication channels or a plurality of communication protocols, one communication management information can be formed. According to the present invention, when carrying out broadcast transmissions, a plurality of communication channels or a plurality of communication protocols can be used. Even in such a case, one communication management information is formed. As a result, the communication management information that is redundant for the user can be eliminated. In addition, the user can be presented with easier understandable communication management information.

In addition, according to the present invention, the communication device includes a communication unit that can carry out the communication by a plurality of communication channels and a plurality of communication protocols. In addition, the communication device includes a holding unit for holding communication management information, and an outputting unit that can output the information. The communication device also includes a controller for controlling the communication via the communication unit, and forming the communication management information for each communication and having the formed communication management information held by the holding unit. When the outputting unit outputs the communication management information, the controller converts the communication management information into outputting information that includes communication result information which is independent of the communication channel and the communication protocol used during the communication. According to such a configuration, the output communication management information is independent of the communication channel and the communication protocol as in the same manner as the above-mentioned inventions. As a result, the user is not confused by the difference in the notation according to the communication channel or the communication protocol. In addition, the user can obtain the communication management information in easily understandable form.

Thus, just by designating the receiving communication device, the communication channel and the communication protocol are selected automatically, and the communication is carried out. Therefore, the communication can be carried out easily with the receiving communication device, and the user can obtain the communication management information, which is a communication history, that is independent of the communication channel or the communication protocol. Thus, the user is not required to be conscious of the communication channel or the communication protocol not only during the communication, but also when managing the communication management information in future. In addition, the communication management information is shown under a format wherein at least the communication result information is independent of the communication channel or the communication protocol. As a result, the contents are simplified and easy to be understood, and the management of the communication management information becomes easy.

BRIEF DESCRIPTION OF THE DRAWINGS

FIG. 2 is a view showing an example of the ability management table of the communication device of the first embodiment of the present invention.

FIG. 5 is a view showing an example of the ability management table of the communication device of the second embodiment of the present invention.

FIG. 6 is a view showing an example of the communication management information of the communication device of the second embodiment of the present invention.

FIG. 7 is a view showing an example of the error codes.

FIG. 10 is a view showing an example of the communication management information of the communication device of the third embodiment of the present invention.

FIG. 11 is a view showing an example of the output result of the communication management information.

DETAILED DESCRIPTION OF THE PREFERRED EMBODIMENTS

Figure 1:
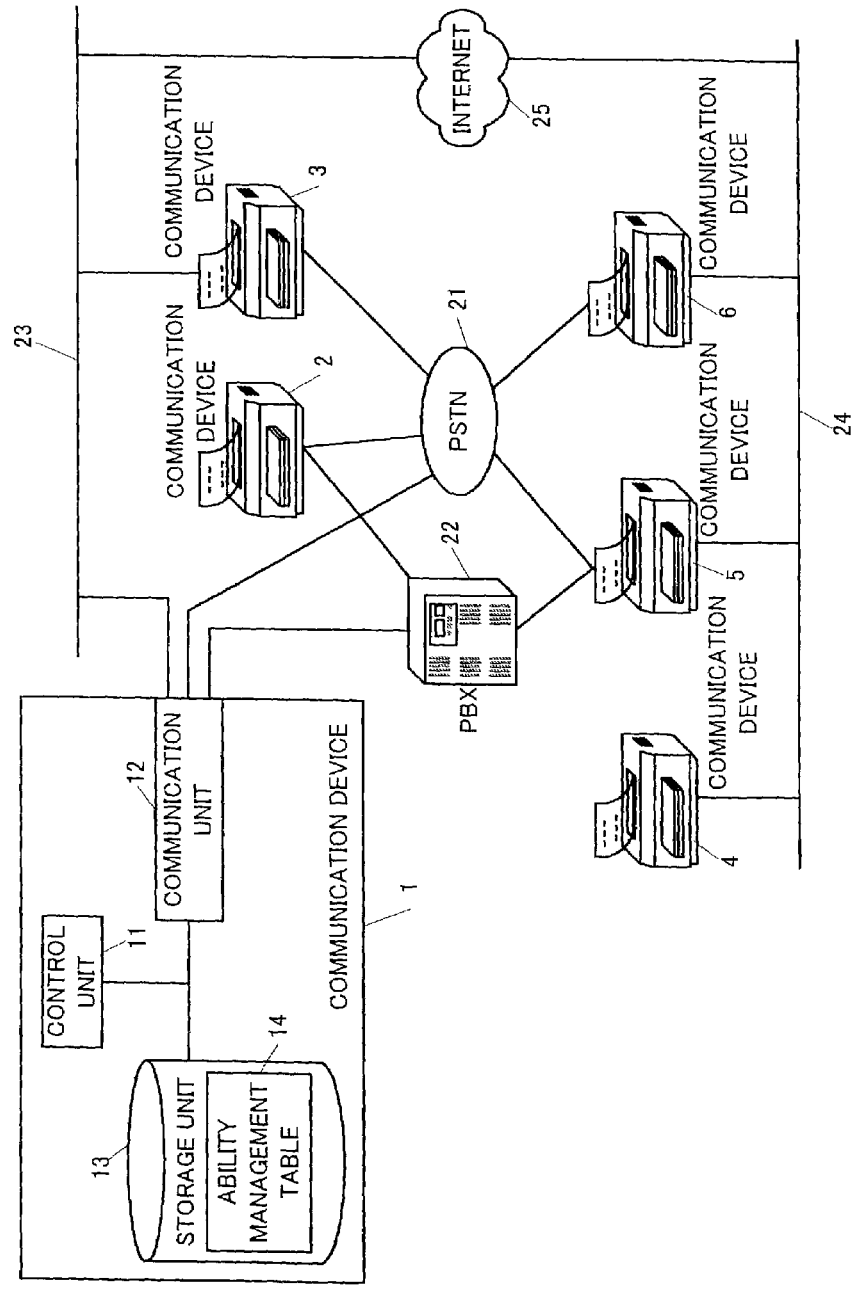
FIG. 1 is a block diagram showing an example of the communication system including the communication device of the first embodiment of the present invention.

FIG. 1 is a block diagram showing an example of communication system including a communication device of a first embodiment of the present invention. In FIG. 1, reference codes 1 through 6 are communication devices, 11 is a control unit, 12 is a communication unit, 13 is a storage unit, 14 is an ability management table, 21 is PSTN, 22 is PBX, 23 and 24 are LAN, and 25 is Internet (IP network). In the example shown in FIG. 1, six communication devices are shown, and for the communication channel, the PSTN 21, the PBX 22, the LAN 23, the LAN 24, and the Internet 25 using the LANs 23, 24 are shown. Moreover, the number of communication devices within the communication system is not limited. In addition, another communication channel can exist, and for example, other than wired communication channel, unwired communication channel, optical communication channel or the like can exist. In addition, there are cases when several communication protocols exist of when each communication channel is used.

In the example shown in FIG. 1, the communication device 1 can carry out the communication via the PSTN 21, the PBX 22, and the LAN 23. The communication device 2 can carry out the communication via the PSTN 21, and the PBX 22. The communication device 3 can carry out the communication via the PSTN 21, and the LAN 23. The communication device 4 can carry out the communication via the LAN 24. The communication device 5 can carry out the communication via the PSTN 21, the PBX 22, and the LAN 24. The communication device 6 can carry out the communication via the PSTN 21, and the LAN 24. The communication devices in the communication system can carry out the communication by any communication channel or any communication protocol.

It is supposed that the communication device 1 is the communication device of the present invention. The communication device 1 includes the control unit 11, the communication unit 12, the storage unit 13, or the like. The control unit 11 controls each units of the communication device 1, and realizes transmission and reception with another communication device via the communication unit 12. When the receiving communication device is designated from an operation unit (not shown in the drawings) or other devices connected to the communication device 1, the ability management table 14 stored in the storage unit 13 to be described later on is searched by the specifying information that specifies the designated receiving communication device. Then, one or a plurality of registered information is obtained. When there is a plurality of registered information, one registered information is selected according to a prescribed priority order, and the communication with the receiving communication device is carried out via the communication unit 12 by the communication channel and the communication protocol selected from the registered information.

The priority order of when selecting the registered information can be, for example, the order the information is registered in the ability management table 14, the order according to a setting when there is a setting of the priority order, or the order ranked according to the type of the communication channel or the communication protocol. Moreover, the communication cost when the communication is carried out with the receiving communication device can be compared for each communication channel and communication protocol, and the registered information of low cost can be used. In addition, the registered information, which is registered with the information relating to the receiving ability most suitable in the communication, can be selected according to the receiving ability of the destination. Furthermore, when a communication fails to end normally as a result of carrying out the communication in accordance with the registered information selected in the manner stated above, the registered information in the next order can be selected, and it can be controlled to carry out the communication again.

Furthermore, when the communication cannot be carried out directly with the receiving communication device, a communication device that can communicate with the communication device 1 and that can communication with the receiving communication device is made the relay communication device. The relay communication device is requested to relay the communication to the receiving communication device. Then, the communication device 1 carries out the communication with the relay communication device, and the communication is carried out with the receiving communication device indirectly.

The communication unit 12 can carry out the communication using one or a plurality of communication channel. In addition, the communication unit 12 can carry out the communication in accordance with one or a plurality of communication protocols even for the same communication channel, by following the control of the control unit 11. In the example shown in FIG. 1, the communication unit 12 can carry out the communication using the Internet 25 via the PSTN 21, the PBX 22, the LAN 23, and the LAN 24 as the communication channels. In addition, the communication unit 12 can carry out the communication by various communication protocols using these communication channels. For example, when using the PSTN 21, the communication unit 12 can carry out the communication by G3 or G4. When using the LAN 23, the communication unit 12 can selectively use the HTTP, FTP (File Transfer Protocol) or the like, other than the SMTP and the POP3 which are used when forwarding the information as an electronic mail.

The storage unit 13 stores various information. The storage unit 13 stores the ability management table 14 in particular. The ability management table 14 is a table registered with specifying information for specifying the communication device, the communication channel and the communication protocol that can be used when carrying out the communication with such a communication device, identification information that is to be used in such a communication channel and a communication protocol, and information that combines other various information. If the communication channel or the communication protocol is different for the same communication device, the registered information is registered as different registered information. Therefore, a plurality of registered information can be registered for one communication device.

FIG. 2 is a view showing an example of the ability management table. In the example of the communication management table 14 shown in FIG. 2, terminal name and specifying number, information such as the communication channel, the identification information, the communication protocol, relay, the receiving ability or the like are made as a group, and each line is the registered information. The terminal name and the specifying number are the specifying information for specifying the receiving communication device. When the user designates a destination, the destination can be designated by these terminal names or the specifying numbers. Further, the terminal name and the specifying number can be set randomly so as not to overlap with one another. For example, the specifying number can be the information that can designate the communication device uniquely in the system. The terminal name can be a name of the communication device, which can be set by the user randomly. Moreover, only either one can be set randomly.

For the communication channel, if the PSTN 21 can be used, it is shown "PSTN". If the PBX 22 can be used, it is shown "PBX". If the LAN 23 or the LAN 24 can be used, it is shown "LAN". In addition, the communication protocol to be used in each communication channel is shown correspondingly.

There are cases when a plurality of communication protocols can be used for the same communication channel. In such a case, the registered information is set for each pair of the communication channels and the communication protocols. For example, for the communication device 4, the LAN 24 can be used for the communication channels, and T.38 and, T.37S and T.37F can be used for the communication protocol. Moreover, when the communication protocol that can be used in certain communication channels is limited to one communication protocol, the communication protocol can be specified from the type of the communication channel. Therefore, it is not necessary to set the communication protocol explicitly.

The identification information is the information of when specifying the communication device in each communication channel or in each communication protocol. For example, if the communication channel is the PSTN 21, the identification information is the telephone number. If the communication channel is the PBX 22, the identification information is the extension number. If the electronic mail is used in the LAN 23 or the LAN 24, the identification information is the electronic mail address. If using the HTTP, the identification information is the URL. In other protocols, for example, the identification information is the IP address or the like.

The information of relay shows whether or not the communication device includes forwarding function for another communication device. For example, when the communication cannot be carried out directly with the receiving communication device, the communication device can request relaying of the communication to a communication device that can communication with both the communication device itself and the receiving communication device. Then, the communication can be carried out substantially with the receiving communication device. However, even when the communication device can communication with both the communication device that requested relaying and the receiving communication device, if the communication device does not include relaying function, relaying of the communication cannot be requested to such a communication device. Therefore, by referring to the field of relay before requesting the relaying to the communication device, the relaying can be requested after confirming that the communication device includes the relaying function.

The receiving ability includes information such as resolution, maximum paper size, encoding method, color printing, etc. For example, when using the PSTN 21 as the communication channel and T.30 as the communication protocol, the ability of one another is confirmed during the communication protocol. Therefore, the ability of the destination can be confirmed at the time of the communication, and the communication can be carried out by the maximum ability within the range. However, for example, when the LAN 23, the LAN 24, or the Internet 25 are used as the communication channel, and the SMTP or the like is used for the communication protocol, there are cases when the ability of the receiving communication device cannot be learnt at the time of the communication.

In such a case, by referring to the field of the receiving ability, the ability of the receiving communication device can be learned for each communication channel and communication protocol. Accordingly, the communication making full use of the ability of the receiving communication device can be carried out, and deterioration in the quality of the information exchanged by the communication can be eliminated or held at a minimum. Further, the kind of information to be held as the receiving ability is random. Moreover, in the example shown in FIG. 2, the receiving ability is held for each registered information. However, for example, an ability table can be stored in the storage unit 13 apart from the ability management table, wherein the ability table corresponds to each communication device and the ability of the communication device.

Further, the form of the ability management table shown in FIG. 2 is just one example, and other various information can be added, or an unnecessary field can be deleted when appropriate. For example, if it is a system structure that does not request relaying, the field for request is unnecessary, and for the terminal name and the specifying number, either one can be included. In addition, in the example shown in FIG. 2, the registered information of the communication device 1 itself is also included, however, this information can be excluded.

Figure 3:
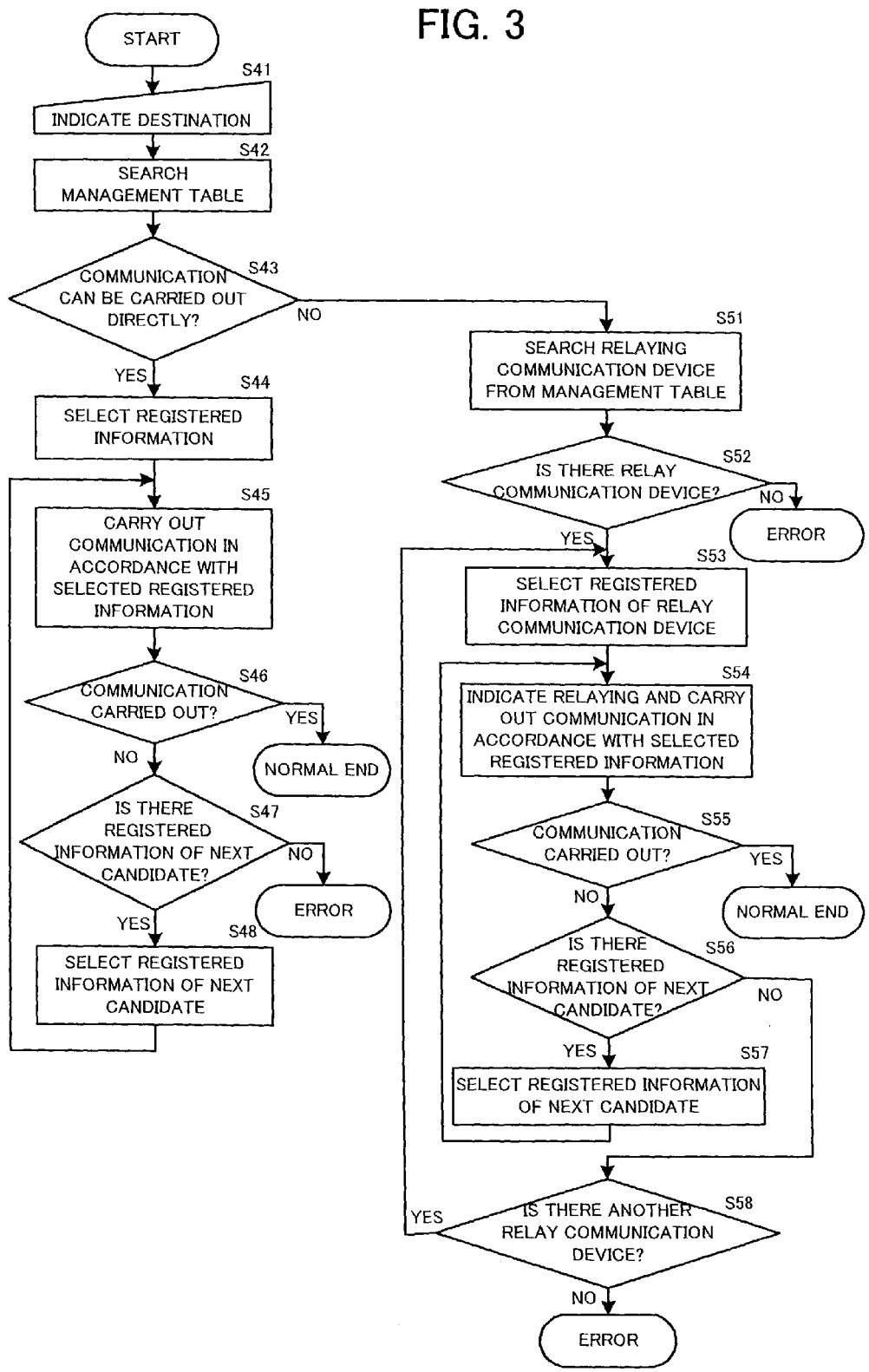
FIG. 3 is a flowchart showing an example of the operation of the communication device of the first embodiment of the present invention.

FIG. 3 is a flowchart showing an example of the operation of the communication device of the first embodiment of the present invention. In S41, the receiving communication device is indicated. The indication of the receiving communication device can be carried out by the user performing an indication operation from the operation unit (not shown in the drawings) as mentioned above. Moreover, the indication of the receiving communication device can be carried out from an outside machine via the LAN 23, other interface (not shown in the drawings), or the like along with the information to be transmitted. In the case of indicating the receiving communication device, for example, when the ability management table 14 as shown in FIG. 2 is stored in the storage unit 13, the indication can be carried out by the terminal name or the specifying number. At that time, for example, when the user operates from the operation unit (not shown in the drawings), the user can input the terminal name or the specifying number directly, or the user can indicate the pre-registered terminal name or specifying number by using a one-touch key, a speed dial key, or the like.

When the receiving communication device is indicated, in S42, the ability management table 14 is searched by the terminal name or the specifying number corresponding to the indicated receiving communication device. In addition, the registered information relating to the receiving communication device is obtained. Then, the communication channel and the communication protocol of the obtained registered information are searched. In S43, it is determined whether or not the communication can be carried out directly with the receiving communication device.

In the case the communication can be carried out directly with the receiving communication device, in S44, information is selected from the registered information searched in S42. The selecting method is random. For example, the selection can be carried out in accordance with a predetermined priority order. As one example, the selection can be carried out in the order the information was registered to the ability management table 14. In the example shown in FIG. 2, when the receiving communication device is the communication device 2, the registered information of the PBX 22 (the communication channel is the PBX) is selected with priority. Moreover, when the receiving communication device is the communication device 6, the PSTN 21 is selected with priority.

As another selecting method, the communication channel or the communication protocol can be put into order according to the kind of the communication channel or the communication protocol. For example, in the case LAN, PBX, and PSTN are put into order in this order as the communication channel, if possible, the registered information via the LAN is given with priority regardless of the order the information was registered in the ability management table 14. Moreover, in the case the LAN cannot be used as in the communication device 2, the registered information via the PBX, which is ranked in the next priority order, is given priority. As in the communication device 4 or the communication device 5 for example, when the LAN is selected for the communication channel, a plurality of registered information exist. In such a case, the selection can be made according to the registered order within the same rank, or the priority order set according to the kind of communication protocol. Moreover, the order can be set by giving priority to the communication protocol.

Furthermore, as another method, communication cost required for the communication with the receiving communication device can be calculated for each of the communication channels and the communication protocols that can be used. Then, after comparing the calculated communication cost, the registered information for the communication channel and the communication protocol that can carry out the communication under the lowest cost can be selected. As in the same manner, the registered information can be selected in accordance with the communication speed. For example, the transmission speed of T.38 or T.37 is faster than the transmission speed of T.30. Therefore, the communication time would be shorter. Moreover, the quality or the accuracy of the communication can be given with priority than the communication speed, and the communication channel and the communication protocol that can carry out the communication accurately can be selected. For example, under the communication via the LAN, the possibility of non-delivery is high. Therefore, the FAX communication can be given with priority. Even within the FAX communication, there are cases when the communication via the PBX 22 can be carried out more accurately and under higher speed with lesser influence of noise or the like, compared to the communication via the PSTN 21. The priority order can be determined by considering these elements.

Furthermore, for example, when the PSTN 21 or the PBX 22 is used, reception from another communication device cannot be made during the communication unless there are plural lines. However, in a network communication of the LAN or the like, there are cases when the reception from another communication device can be made even during the communication. This can be used as the priority order, and as in the network communication of the LAN or the like, full duplex communication can be given priority than half duplex communication.

In addition, as shown in FIG. 2, when the receiving ability is stored in the ability management table, registered information can be selected that is set with the receiving ability most suitable for the information that is attempted to be transmitted. Moreover, even when the selection is made according to the above-mentioned various priority orders, if the transmission of the information is limited due to the receiving ability, the priority order can be lowered.

Moreover, the priority order is not limited to the examples mentioned above. Various priority orders can be set, or the registered information can be selected in accordance with the condition set for the selection. In addition, these methods can be used together, and the priority order can be determined by considering various advantages and disadvantages. Further, in the case there is a field for the priority order within the ability management table 14, the registered information can be selected in accordance with the field value. As in such a manner, according to the present invention, the communication channel or the communication protocol is selected automatically. Therefore, even in the case the communication device of the destination includes a plurality of the communication channels or communication protocols, the user is not required to select the communication channel or the communication protocol, or to set the identification information such as the telephone number or the address accompanying the selection.

After the registered information is selected, in S45, the communication is carried out by the registered communication protocol by using the communication channel registered in the selected registered information. At this time, the identification information, which is to be used in the communication channel and the communication protocol for carrying out the communication, is included in the selected registered information. Therefore, the receiving communication device is specified by using such identification information.

In S46, it is determined whether or not the communication has ended normally. If the communication has ended normally, the communication is ended. If the communication has not ended normally, in S47, it is determined whether or not there is registered information of next candidate. When there is the registered information of the next candidate, in S48, the registered information of the next candidate is selected in accordance with the above-mentioned priority order. Then, it returns to S45, and the communication is carried out in accordance with the selected registered information of the next candidate. As in such a manner, the registered information is selected in accordance with the priority order, and the communication is carried out under the communication channel and the communication protocol that can carry out the communication.

Therefore, in the case the receiving communication device includes a plurality of communication channels or communication protocols, even when either one of the communication channels or the communication protocols cannot be used, the communication channel or the communication protocol that can be used is selected automatically, and the communication is carried out. At that time, the user is not required to carry out any complicated operations. Further, after several times of attempts under the same registered information by combining the conventional redial function or the like, the communication for such a registered information can be assumed to have not ended normally. When the communication cannot be carried out even by using any of the registered information, it is a communication error.

When it is determined in S43 that the communication cannot be carried out directly with the receiving communication device, another communication device is requested to relay the communication under the present invention. Therefore, in S51, a relay communication device is searched from the ability management table 14. The relay communication device is a communication device that can carry out the communication by the communication channel and the communication protocol which can be communicated by the communication unit 12 of the communication device 1. In addition the relay communication device is a communication device that can carry out the communication by the communication channel and the communication protocol which can be communicated by the receiving communication device. The searching for the relay communication device can be realized by searching the communication channel and the communication protocol stored in the ability management table 14. In addition, in the ability management table 14 shown in FIG. 2, the field for relay is referred, and the fact that the communication device includes the relaying function is to be the condition for being the relay communication device.

In S52, it is determined whether or not there is a relay communication device as a result of the search in S51. When there is no appropriate relay communication device, it is to be a communication error. Further, in such a case, it can be attempted to carry out the communication via two or more relay communication devices, as re-relaying. When there is a relay communication device, in S53, among the registered information of the relay communication device, one registered information is selected in accordance with the above-mentioned various priority orders. Further, when a plurality of relay communication devices exist, one relay communication device is selected in accordance with a prescribed priority order, etc., and the registered information is selected for the selected communication device. In addition, when selecting the communication device that is to be the relay communication device, the receiving ability of the relay communication device can also be included in criteria for determining the priority order for the selection, such that deterioration in the information, such as the deterioration in the image quality, does not generate due to the limitation of the receiving ability of the relay communication device.

Then, in S54, the relay communication device is indicated to relay the communication to the receiving communication device, and the information is forwarded in accordance with the selected registered information. In S55, it is determined whether or not the communication with the relay communication device, or the communication with the receiving communication device via the relay communication device has ended normally. When it is determined that the communication has ended normally, the communication is ended. When it is determined that the communication has not ended normally, in S56, it is determined whether or not there is the register information of the next candidate corresponding to the relay communication device. When it is determined that there is the registered information of the next candidate, in S57, the registered information of the next candidate is selected in accordance with the above-mentioned priority order. Then, it returns to S54, and the communication is carried out with the relay communication device in accordance with the selected registered information of the next candidate. Moreover, when it is determined that there is no registered information of the next candidate, in S58, it is determined whether or not there are communication devices that can be another relay communication device. When there are communication devices that can be another relay communication device, one communication device is to be selected. Then, it returns to S53, the registered information of the selected relay communication device is selected, and the relaying is requested to the relay communication device. When any one of the communication devices is selected which can be the relay communication device, and the communication cannot be carried out normally by using any one of the registered information, it is to be a communication error.

Even in the case there is no communication channel that can carry out the communication directly with the receiving communication device, or in the case when there is the communication channel but the communication protocol is different and the communication cannot be carried out as is, the relay communication device, and the communication channel and the communication protocol that are to be used in the communication with the relay communication device are selected automatically. Then, the relay communication device is requested to relay the communication to the receiving communication device, and the communication is carried out. Therefore, the user can carry out the communication with the receiving communication device by using the relaying function of another communication device, without being aware that the communication cannot be carried out directly, and without carrying out any complicated operations.

Moreover, such automatic determination for whether or not to use the relaying function can be made settable. In addition, the relay communication device can be selected with certain limited range, for example, by limiting in advance the communication device that uses the relaying function, or setting a limitation also for the communication channel and the communication protocol.

As an example for when carrying out the above-mentioned relaying, in the example of the system shown in FIG. 1, a case can be assumed in which the communication device 2 attempted to carry out the communication to the communication device 4 as the receiving communication device. The communication device 2 can carry out the communication using the PSTN 21 and the PBX 22. However, the communication device 4 can carry out only the communication using the LAN 24. Therefore, the communication cannot be carried out directly between the communication device 2 and the communication device 4. In such a case, a communication device, which can be the relay communication device, is searched. Such a relay communication device can carry out the communication with the communication device 2 by using the PSTN 21 and the PBX 22, and the communication with the communication device 4 by using the LAN 24. In this example, any one of the communication device 1, the communication device 3, the communication device 5, and the communication device 6 can carry out the communication directly with the communication device 2 and the communication device 4. However, since the communication device 6 does not have the relaying function, the communication device 6 cannot be the relay communication device. Therefore, either the communication device 1, the communication device 3, or the communication device 5 is to be used as the relay communication device.

For example, when the communication device 1 is selected as the relay communication device, the communication device 2 selects either the PSTN 21 or the PBX 22 as the communication channel. The communication device 2 indicates the communication device 1 to relay the communication to the communication device 4. Then, the communication is carried out between the communication device 2 and the communication device 1. The communication device 1 indicated to relay carries out the communication with the communication device 4 via the LAN 23, the Internet 25, and the LAN 24. In such a case, the information being transmitted from the communication device 2 is forwarded to the communication device 4 as an electronic mail. The communication device 1 can return the communication result of the relaying to the communication device 2 after forwarding to the communication device 4, the information received from the communication device 2 in the relaying.

If the forwarding of the information cannot be carried out normally from the communication device 1 to the communication device 4, since the communication device 1 does not include other registered information concerning the communication with the communication device 4, the communication device 2 selects another communication device, for example, the communication device 3 or the communication device 5. Then, the communication device 2 requests relaying to the selected communication device. Further, when carrying out the relay forwarding in real time, the relaying result is returned during the communication with the communication device of the transmitter. However, there are cases when the electronic mail is transmitted to the receiving communication device after the communication to the relay communication device has ended, or when the delivery confirmation of the electronic mail is returned after quite a while. Therefore, the condition for the relaying can be set appropriately for each communication channel, communication protocol, or the like. Moreover, only the communication result between the transmitter communication device and the relay communication device can be determined. The communication result between the relay communication device and the receiving communication device may not be notified to the transmitter communication device. Moreover, the delivery confirmation can be notified to the transmitter communication device from the receiving communication device by the relay communication again. Further, the result of the relay communication can be held as the communication history of the communication device that relayed the communication.

As in such a manner, according to the present invention, the user can carry out the communication with the receiving communication device without being conscious about the difference in the communication channel or the communication protocol, or further about the difference in the identification information of each communication device that is determined by the communication channel or the communication protocol. In addition, the user is not required to be conscious about whether or not the communication can be carried out directly with the receiving communication device. By constructing the system by such communication device of the present invention, an integrated communication network system, wherein the communication can be carried out between one another, can be provided such that it appears that all communication devices exist on one communication network.

In the example of the operation shown in FIG. 3, the relay communication is used when the communication failed to be carried out directly. However, the operation is not limited to the above-mentioned example. The relay communication can be used positively, and the direct communication and the relay communication can be made selectable according to a priority order. For example, when determining by giving priority to the communication speed, the determination can be made in the priority order of (priority for communication speed in direct communication)>(priority for communication speed in relay communication)>(priority for accuracy by direct communication)>(priority for accuracy by relay communication). Under such a priority order, the determination can be made for whether to carry out the direct communication or whether to carry out the relay communication, along with the communication channel and the communication protocol. When carrying out the relay communication, the relay communication device (and communication, communication protocol) can be determined. In addition, the above-mentioned other priority order can be combined.

Furthermore, when carrying out broadcast transmission wherein the same information is transmitted to a plurality of communication devices, in the case of FAX communication or T.38 using the PSTN 21 or the PBX 22, it is to be a sequential broadcasting, wherein the information is transmitted to each communication device in order. However, in the case of using T.37, an indication of broadcasting can be carried out to a mail server (while adding a plurality of identification information), and by transmitting only one electronic mail, transmission (concurrent broadcasting) can be carried out concurrently to a plurality of receiving communication devices. For example, even in the case the communication device itself cannot carry out the broadcast transmission by the electronic mail, if a communication device that can carry out the concurrent broadcasting by the electronic mail exists within the system, there are cases when the concurrent broadcasting can be carried out by requesting such communication device for relaying. Therefore, by changing the selection method when transmitting to a single address, and when carrying out the broadcast transmission, the efficiency in the use of the system can be improved. In such a case, when transmitting to a single address, for example, the registered information can be selected according to the above-mentioned various priority orders. When carrying out the broadcast transmission, the priority order can be set as, for example, (collective broadcasting by the communication device itself (for example, T.37))>(concurrent processing by relay distribution)>(sequential broadcasting by the communication device itself). Moreover, this priority order and the above-mentioned various priority orders can be combined when appropriate, and used.

In the above description for the communication device of an embodiment of the present invention, the setting method of each registered information to the ability management table, the setting method of the priority order of when selecting the registered information, etc. are random. These settings can be made by the user from the operation unit (not shown in the drawings) that is provided in the communication device. In addition, these settings can be received from outside via the communication unit 12. In such a case, for example, it is possible to set the settings to be common within the system. In addition, the ability management table or the like can be managed by, for example, a management server, management center, or the like.

Figure 4:
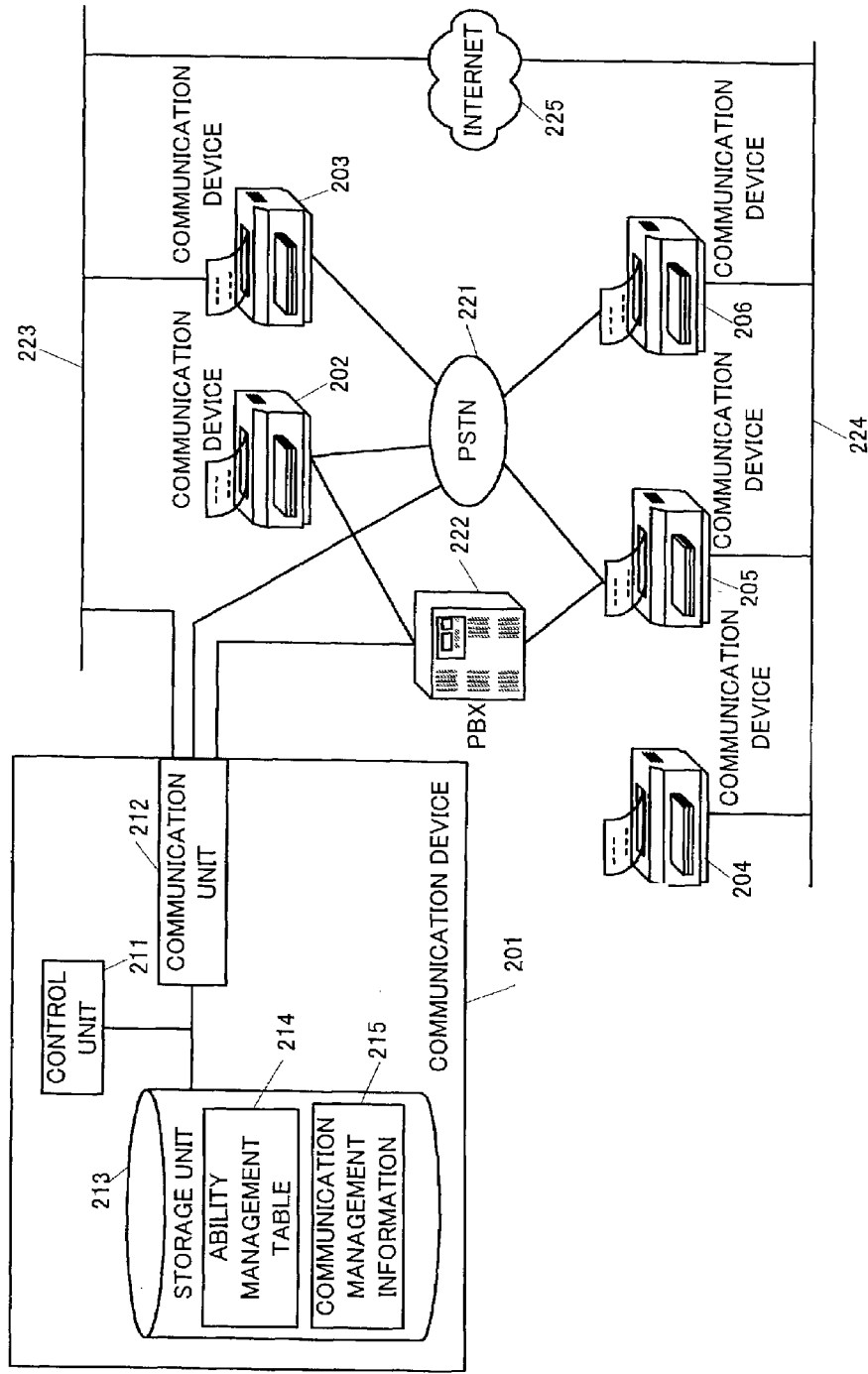
FIG. 4 is a block diagram showing an example of the communication system including the communication device of the second embodiment of the present invention.

FIG. 4 is a block diagram showing an example of the communication system which includes the communication device of the second embodiment of the present invention. In FIG. 4, the reference codes 201~206 are communication devices, 211 is a control unit, 212 is a communication unit, 213 is a storage unit, 214 is an ability management table, 215 is a communication management information, 221 is PSTN, 222 is PBX, 223, 224 are LANs, and 225 is the Internet (IP network). In the example shown in FIG. 4, six communication devices are shown, and for the communication channel, the PSTN 221, the PBX 222, the LAN 223, the LAN 224, and the Internet 225 using the LANs 223, 224 are shown. Moreover, the number of communication devices within the communication system is not limited. In addition, another communication channel can exist, and for example, unwired communication channel, optical communication channel or the like can exist, other than wired communication channel. In addition, there are cases when several communication protocols exist of when each communication channel is used.

In the example shown in FIG. 4, the communication device 201 can carry out the communication via the PSTN 221, the PBX 222, and the LAN 223. The communication device 202 can carry out the communication via the PSTN 221, and the PBX 222. The communication device 203 can carry out the communication via the PSTN 221, and the LAN 223. The communication device 204 can carry out the communication via the LAN 224. The communication device 205 can carry out the communication via the PSTN 221, the PBX 222, and the LAN 224. The communication device 206 can carry out the communication via the PSTN 221, and the LAN 224. The communication devices within the communication system can carry out the communication by any communication channel or communication protocol.

It is supposed that the communication device 201 is the communication device of the present invention. The configuration of the communication devices 202~206 can be random, but it can be the same as the configuration of the communication device 201. The communication device 201 includes the control unit 211, the communication unit 212, the storage unit 213, or the like. The control unit 211 controls each units of the communication device 201. In addition, the control unit 211 realizes transmission and reception with another communication device via the communication unit 212. When the receiving communication device is designated from an operation unit or other device (not shown in the drawings) connected to the communication device 201, the ability management table 214 in the storage unit 213 to be described later on is searched by the specifying information that specifies the designated receiving communication device. Then, one or a plurality of registered information is obtained. When there are a plurality of registered information, one registered information is selected according to a prescribed priority order. Then, the communication with the receiving communication device is carried out via the communication unit 212 by the communication channel and the communication protocol of the selected registered information.

The priority order when selecting the registered information can be, for example, the order the information is registered in the ability management table 214, the order according to a setting when there is a setting of the priority order, or the order ranked according to the types of the communication channel or the communication protocol. Moreover, the communication cost when the communication is carried out with the receiving communication device can be compared for each communication channel and communication protocol, and the registered information of low cost can be used. In addition, the registered information can be selected that is registered with the information relating to the receiving ability most suitable in the communication according to the receiving ability of the receiving communication device. Moreover, there are cases when it is advantageous when the communication is carried out via another relay communication device, and the determination for whether or not to use the relaying can be considered when deciding the priority order. Furthermore, in the case the communication failed to end normally as a result of carrying out the communication in accordance with the registered information selected in the manner stated above, the registered information in the next order can be selected, and it can be controlled to carry out the communication again.

Furthermore, when the communication cannot be carried out directly with the receiving communication device, a communication device that can communicate with both the communication device 201 and the receiving communication device is to be the relay communication device. The relay communication device is requested to relay the communication to the receiving communication device. Then, the communication device 201 carries out the communication with the relay communication device, and the communication is carried out indirectly with the receiving communication device. Moreover, the relay communication device can include a relaying function for relaying the communication by receiving request for relay from another communication device.

The control unit 211 forms communication management information 215 as the communication history for each communication, and have the communication management information 215 held by the storage unit 213. The communication management information 215 to be formed includes the communication result information along with the information such as the date and time of communication, the name of the receiving communication device, and the number of communication pages. The communication result information is information independent of the communication channel and the communication protocol used during the communication. Moreover, various information of the communication that is dependent on the used communication channel and the communication protocol can be held incrementally. In addition, when the re-communication is carried out as stated above, one communication management information 215 is formed for the first communication and one or a plural times of re-communication.

In such a case, if the communication has ended normally by the re-communication, the final communication result is the normal end. If the communication cannot be carried out normally even when the re-communication is carried out, the communication management information 215 can be formed from the communication result for either the first communication or the last communication, or the communication result determined comprehensively, as the information independent of the communication channel and the communication protocol. Accordingly, the midterm communication management information or the like that is unnecessary for many users can be eliminated. Furthermore, in the case the communication to a plurality of receiving communication devices is indicated, as in the case of carrying out the broadcast transmission, even when the communication is carried out by using a plurality of communication channels or a plurality of communication protocols, one communication management information 215 is formed. In such a case, redundancy in the communication management information can be eliminated.

The communication unit 212 can carry out the communication using one or a plurality of communication channel. In addition, the communication unit 212 can carry out the communication in accordance with one or a plurality of communication protocols even for the same communication channel, by following the control of the control unit 211. In the example shown in FIG. 4, the communication unit 212 can carry out the communication using the Internet 225 via the PSTN 221, the PBX 222, the LAN 223, and the LAN 224 as the communication channels. In addition, the communication unit 212 can carry out the communication by various communication protocols using these communication channels. For example, when using the PSTN 221, the communication unit 212 can carry out the communication by G3 or G4. When using the LAN 223, the communication unit 212 can selectively use the HTTP, the FTP, or the like, other that the SMTP and the POP3 which are used when forwarding the information as an electronic mail.

The storage unit 213 stores various information. The storage unit 213 stores the ability management table 214 and the communication management information 215 in particular. The ability management table 214 is a table registered with a plurality of registered information formed from specifying information for specifying the communication device, the communication channel and the communication protocol that can be used when carrying out the communication with such a communication device, identification information that is to be used in such a communication channel and a communication protocol, and other various information. If the communication channel or the communication protocol is different for the same communication device, the registered information is registered as different registered information. Therefore, a plurality of registered information can be registered for one communication device.

FIG. 5 is a view showing an example of the ability management table. In the example of the ability management table 214 shown in FIG. 5, terminal name and specifying number, information such as the communication channel, the identification information, the communication protocol, relay, the receiving ability or the like are made as a group, and each line is the registered information. The terminal name and the specifying number are specifying information for specifying the receiving communication device. When the user designates a receiving communication device, the receiving communication device can be designated by these terminal names or the specifying numbers. Further, the terminal names and the specifying numbers can be set randomly so as to not to overlap to one another. For example, the specifying number can be information that can designate the communication device uniquely in the system. The terminal name can be a name for the communication device which the user can set randomly. Moreover, only either one can be set randomly.

For the communication channel, if the PSTN 221 can be used, it is shown "PSTN". If the PBX 222 can be used, it is shown "PBX". If the LAN 223 or the LAN 224 can be used, it is shown "LAN". Further, when the LAN can be used, it is supposed that the Internet or the intranet can be used via the LAN. Moreover, if another communication channel can be used, such a communication channel is shown in this field.

In addition, the communication protocol to be used in each communication channel is shown correspondingly. There are cases when a plurality of communication protocols can be used even for the same communication channel. In such a case, the registered information is set for each pair of the communication channel and the communication protocol. For example, for the communication device 204, the LAN 224 can be used for the communication channel, and T.38 and, T.37S and T.37F can be used for the communication protocol. Moreover, the communication protocols are not limited to the communication protocols shown in FIG. 5. In addition, in the case the communication protocol that can be used in certain communication channel is limited to one communication protocol, the communication protocol can be specified from the types of the communication channel. Therefore, it is not necessary to set the communication protocol explicitly.

The identification information is the information of when specifying the communication device in each communication channel or in each communication protocol. For example, if the communication channel is the PSTN 221, the identification information is the telephone number. If the communication channel is the PBX 222, the identification information is the extension number. If the electronic mail is used in the LAN 223 or the LAN 224, the identification information is the electronic mail address. If using the HTTP, the identification information is the URL. In other protocols, for example, the identification information is the IP address or the like.

The information of relay shows whether or not the communication device includes forwarding function for another communication device. When requesting the relaying, this field is referred, and the communication device having the relaying function is requested.

The receiving ability includes information such as resolution, maximum paper size, encoding method, color printing, or the like. For example, when using the PSTN 221 as the communication channel and T.30 as the communication protocol, the ability of one another is confirmed during the communication protocol. Therefore, the ability of the receiving communication device can be confirmed at the time of communication, and the communication can be carried out by the maximum ability within the range. However, for example, when the LAN 223, the LAN 242, or the Internet 225 are used as the communication channel, and the SMTP or the like is used for the communication protocol, there are cases when the ability of the receiving communication device cannot be learned at the time of the communication.

In such a case, by referring to the field of the receiving ability, the ability of the receiving communication device can be learned for each communication channel and communication protocol. Accordingly, the communication making full use of the ability of the receiving communication device can be carried out, and deterioration in the quality of the information exchanged by the communication can be eliminated or held at minimum. Further, the kind of information to be held as the receiving ability is random. Moreover, in the example shown in FIG. 5, the receiving ability is held for each registered information. However, for example, an ability table can be stored in the storage unit 213 apart from the ability management table, wherein the ability table corresponds each communication device to the ability of the communication device.

The ability management table shown in FIG. 5 is just one example, and other various information can be added, or unnecessary field can be deleted when appropriate. For example, in the case of a system structure not requesting relay, the field for relay in unnecessary. On the contrary, the communication device carrying out the relaying can be indicated explicitly. Moreover, when using all communication channels and communication protocols, if the ability can be exchanged during the communication, the field of the receiving ability is unnecessary.

The communication management information 215 is the information relating to the communication history formed in the control unit 211 as described above. FIG. 6 is a view showing an example of the communication management information of the communication device of the second embodiment of the present invention. FIG. 7 is a view showing an example of error codes. FIG. 6(A) shows the communication management information that is stored in the storage unit 213. FIG. 6(B) shows abnormal information generated actually during the communication.

In the example of the communication management information 215 shown in FIG. 6(A), each line shows the communication management information for one communication. Each communication management information 215 includes fields for number, receiving communication device, mode, date and time, number of pages, result, remarks, etc. Moreover, the determination for which kinds of information is to be remained as the communication management information 215 is made at the time the table is formed, and the determination can be made randomly. In the present invention, the information independent of the communication channel or the communication protocol is included as at least the communication result information (in the result field).

Sequential numbers are written in the number field. The present invention is not limited to such a numbering. The number field can include any information if the information can specify each communication management information 215. If the communication can be specified by another information, the number field is unnecessary. The receiving communication device field includes the information for specifying the receiving communication device at the time of the communication. The terminal name or the specifying number in FIG. 5 can be used for the receiving communication device field. For the mode field, the information relating to the image quality is held in the example shown in FIG. 6(A). Moreover, various communication mode can be included, such as color mode or picture mode, apart from regular image quality, high image quality, super-high image quality, or the like. For the date and time field, the date and time of the communication is stored. For the field for the number of pages, the number of pages transmitted and received is stored.

For the result field, the result of each communication is stored. Especially in the present invention, the communication result independent of the communication channel or the communication protocol is stored. In the example shown in FIG. 6(A), if the communication has ended normally, "OK" is stored. However, in actual communication, there are cases when the communication cannot be ended normally when the communication is carried out by certain communication channel or by certain communication protocol. Even in such a case, if the communication can be carried out normally by using another communication channel or another communication protocol, it is supposed that the communication has ended normally as a whole. Therefore, the result field is written "OK" also for such a case.

Moreover, when the communication failed to end normally, an error code is stored in the result field. In such a case, there is a possibility for various kinds of error to generate by each communication channel or the communication protocol. As an example, the error to be generated in each communication protocol is classified as shown in FIG. 7, and the error codes shown in the leftmost field is added. For example, an error code "T.1-1" is applied for the case of "dial error" when the connection to the receiving communication device cannot be made by using T.30, "mail server connection error" when the connection with the mail server cannot be made by using T.37, and "receiving communication device connection error" when the connection with the receiving communication device cannot be made by using T.38.

By classifying each communication protocol laterally in such a manner and applying the error code, the error codes independent of the communication protocol can be formed. In addition, the fact indicating at which stage the error is generating can be shown schematically. For normal users, the detail of the error codes is not necessary for most cases, and such schematic error codes are sufficient. For the communication management information of the number "3" shown in FIG. 6(A), the communication is carried out actually by using the communication protocol of T.37F, and an error of "no delivery confirmation" is generated, as shown in FIG. 6(B). In such a case, "T.4-1" from FIG. 7 is stored in the result field, independently of the communication protocol.

Further, in the example shown in FIG. 7, the error codes common for the communication protocols are shown. However, by having the error codes to be common for all the communication protocols to be used, error codes that are independent of the communication channel to be used can be set. In other words, the example of FIG. 7 shows the error codes that are independent of the communication channel and the communication protocol.

Any information can be stored in the remarks field. In the example shown in FIG. 6(A), the kind of applied communication is stored when the applied communication is carried out. For the communication management information for the number "4", it shows that the broadcast communication has been carried out.

The communication management information 215 shown in FIG. 6(A) is just one example, and the information to be included can be selected. For example, the error information that generated actually or the information relating to the used communication channel and the communication protocol as shown in FIG. 6(B) can be included as the communication management information.

Figure 8:
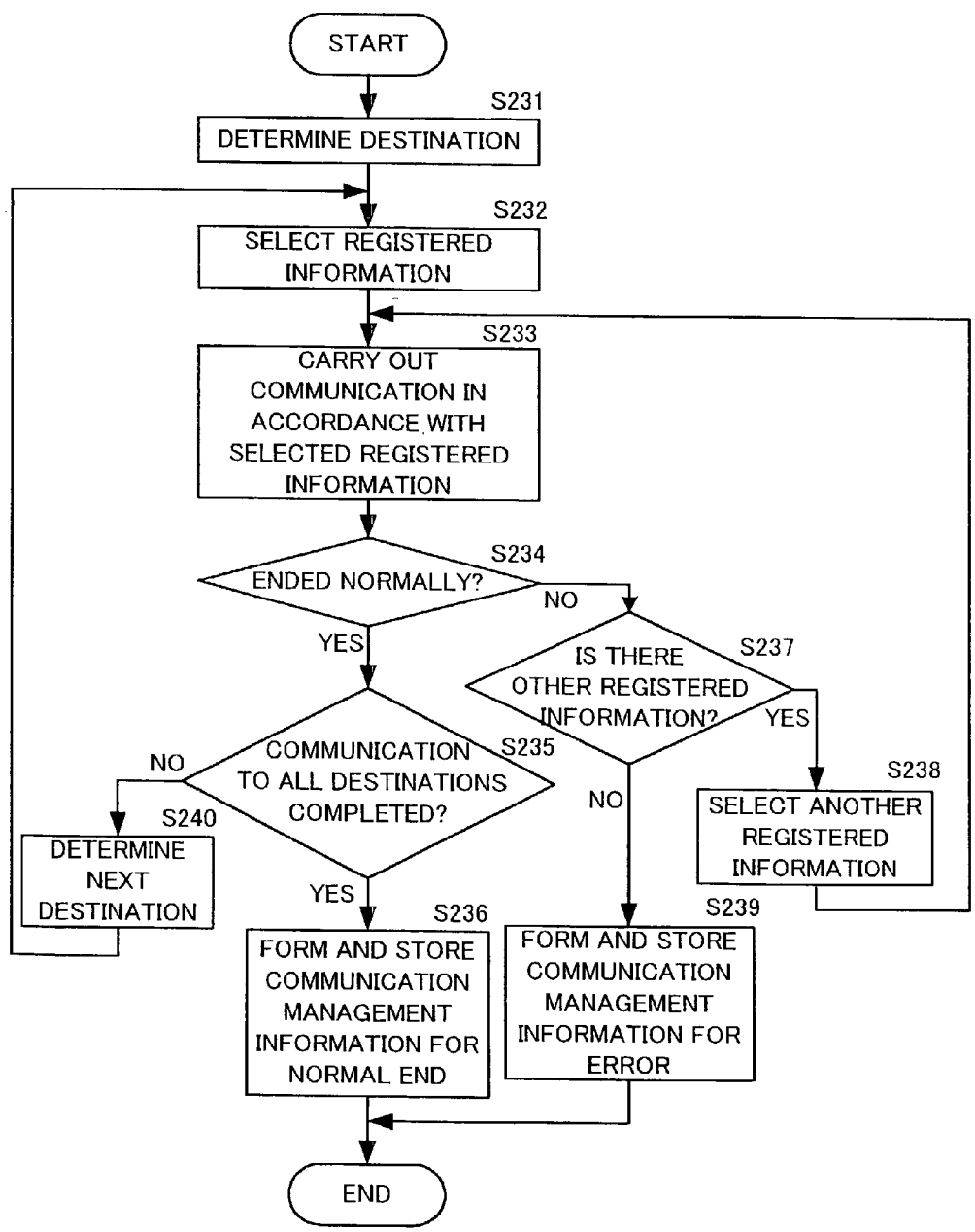
FIG. 8 is a flowchart showing an example of the communication operation in the communication system including the communication device of the second embodiment of the present invention.

FIG. 8 is a flowchart showing an example of the communication operation in the communication system including the communication device of the second embodiment of the present invention. First, in S231, the receiving communication device is indicated. For example, the indication of the receiving communication device is made from an operation unit (not shown in the drawings) or from outside. At this time, in the case a plurality of receiving communication devices are indicated as in the broadcast transmission or the like, when the transmission can be carried out to one receiving communication device, or when the transmission to the plurality of receiving communication devices can be carried out at once by an electronic mail or the like, (a part of or all of) the plurality of receiving communication devices to which the transmission can be carried out at once is selected.

When the receiving communication device is determined, the registered information to be used in the communication is selected from the ability management table 214. At this time, in the case there are a plurality of communication channels and a plurality of communication protocols that can carry out the communication with the receiving communication device, either one of the registered information is selected from the plurality of the registered information. In such a case, the selection can be made in accordance with, for example, a prescribed priority order. Moreover, there are cases when the communication is carried out directly with the receiving communication device, or when another communication device is requested to relay the communication. In such a case, one information is selected from the registered information corresponding to the relay communication device.

Then, in S232, the communication channel and the communication protocol are selected in accordance with the selected registered information. In S233, the communication is carried out with the receiving communication device or the relay communication device via the communication unit 212. In S234, it is determined whether or not the communication has ended normally. When it is determined that the communication has ended normally, in S235, it is determined whether or not there are any further receiving communication devices left. When it is determined that there is a receiving communication device still left that is yet to carry out the communication, in S240, the next receiving communication device for carrying out the communication is determined. Then, it returns to S232, and the communication with such a receiving communication device is carried out. When the communication with all receiving communication devices has ended normally and there are no more other receiving communication devices left, in S236, one communication management information at the time of normal end is formed. Then, the formed communication management information is stored in the storage unit 213, and the processing of the communication is ended. As in such a manner, even when a plurality of receiving communication devices are designated and the communication is carried out for a plural number of times, one communication management information is formed for one indication by the user. Therefore, redundancy in the communication management information can be eliminated, and easily understandable communication management information can be presented.

When the communication in S233 failed to end normally, it proceeds from S234 to S237. In S237, it is determined whether or not there is another registered information that can carry out the communication with the selected receiving communication device. When there is another registered information, in S238, one information is selected from other registered information. Then, it returns to S233, and the communication is carried out in accordance with the selected registered information. Further, when selecting another registered information in S238, various communication methods can be switched flexibly. For example, the direct communication with the receiving communication device can be switched to relay communication, or the reverse can be made, or the processing for carrying out the broadcast communication at the same time can be switched for the sequential transmission to each receiving communication device. Moreover, after several times of attempts under the same registered information by combining with the redial function or the like that are used conventionally, another registered information can be selected.

When it is determined in S237 that there is no other registered information that can carry out the communication with the receiving communication device, any further communication is impossible. Therefore, in S239, one communication management information at the time of error is formed. The formed communication management information is stored in the storage unit 213, and the processing of the communication is ended. For the communication management information to be formed at this time, the error code that is independent of the used communication channel or the communication protocol is stored as the communication result information. Further, in the case the communication to a plurality of receiving communication devices are designated, the communication to another receiving communication device can be continued.

As in such a manner, even when the communication fails to end normally, the communication management information is not formed if the communication ends normally afterward. Therefore, the user can refer to the communication management information and determine easily whether or not the communication has ended normally, without being confused by the information of the communication error. Moreover, in the case the communication failed to be carried out normally even when either communication channel or the communication protocol is selected, the communication management information of the communication error is formed. Also in this case, only one communication management information is formed, and the error code independent of the used communication channel or the communication protocol is stored. Therefore, the user can easily know in which indicated communication the error generated, and the degree of the error.

As described above, the communication device of the present invention carries out the communication by automatically selecting the registered information within the ability management table 214. When carrying out the communication, the user is not required to carry out the indication of the communication channel, the communication protocol, or the like, and the user can just indicate the receiving communication device. In other words, the user is not required to be conscious about which communication channel is to be used, or which communication protocol is to be used. Therefore, even when various information is presented for each used communication channel or communication protocol as the communication management information, since the user is not conscious about these information during the communication from the beginning, the presentation of the detailed information will just confuse the user. In addition, such various information is unnecessary for the user. According to the present invention, by presenting the communication result information independent of the communication channel or the communication protocol to the user, the user can be unconscious about the communication channel, the communication protocol or the like regarding the communication management information. In addition, the user can easily understand the communication result information for the indication of the communication.

Further, in the above description, the communication management information of the transmission was shown in particular. The communication management record to be formed at reception is also the same, and the communication result information independent of the communication channel and the communication protocol can be included in the communication management record and stored in the storage unit 213.

Figure 9:
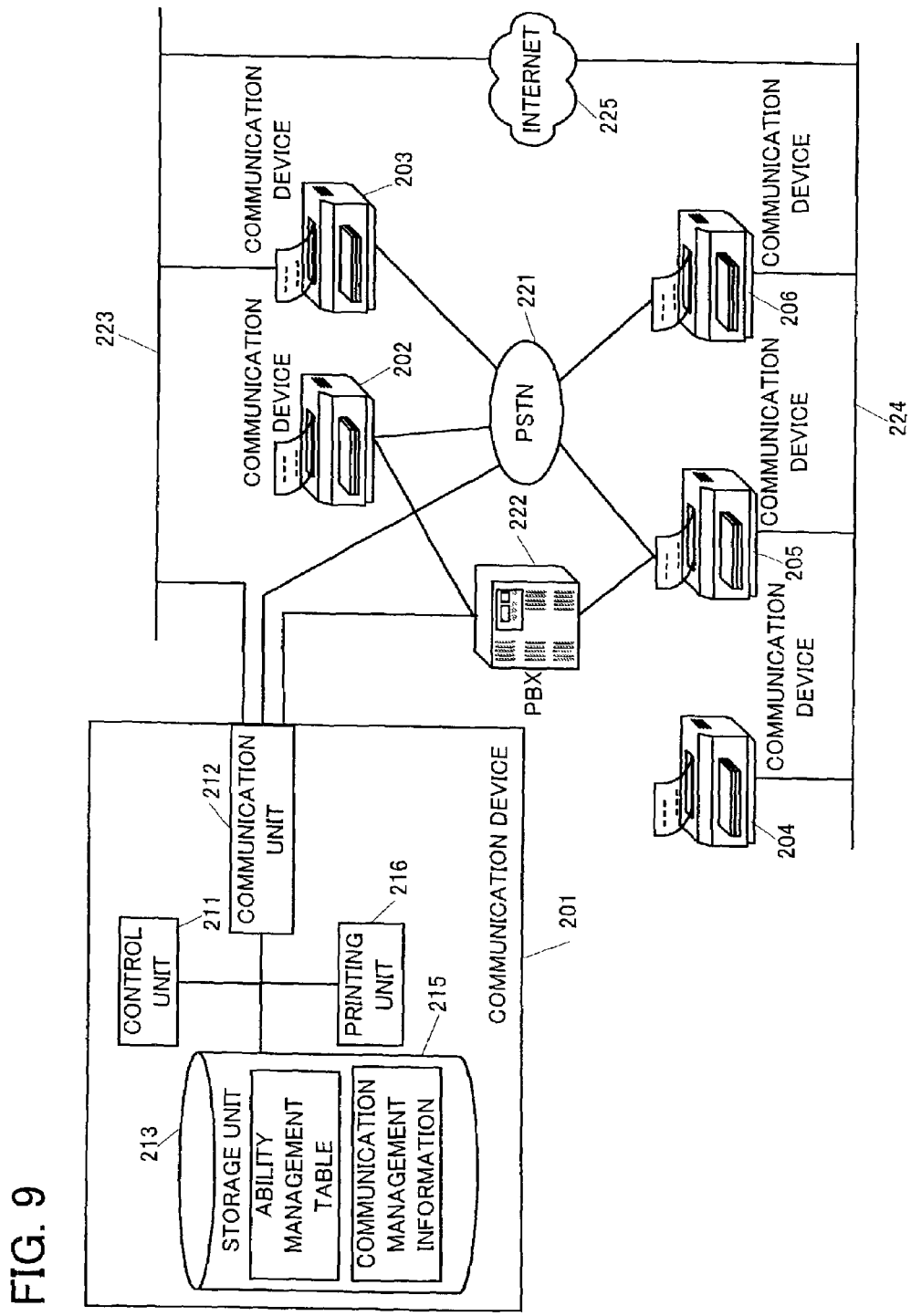
FIG. 9 is a block diagram showing an example of the communication system including the communication device of the third embodiment of the present invention.

FIG. 9 is a block diagram showing an example of the communication system including the communication device of the third embodiment of the present invention. In FIG. 9, for the parts that are the same as those shown in FIG. 4, same reference codes are applied, and the description will be abbreviated. The reference code 216 is a printing unit. In the above-described second embodiment, when forming the communication management information 215, an example was shown in which the communication result information independent of the communication channel or the communication protocol is stored. The communication result information can be in a form independent of the communication channel or the communication protocol before the user refers to the information. Therefore, in the third embodiment, the communication result information is converted into a form independent of the communication channel or the communication protocol at the time of output, for example, when presenting the information to the user.

In other words, in the third embodiment, the detailed information of the communication is left in the communication management information 215 stored in the storage unit 213. FIG. 10 is a view showing an example of the communication management information of the communication device of the third embodiment of the present invention. As shown in FIG. 10, the result field stores the detailed communication result information for each communication channel or communication protocol used in each communication. In addition, when carrying out re-communication, the communication management information is left for each of the communications. For example, the communication management information in the second line and the third line show a case in which in the communication with the communication device 203, the communication failed when the communication was carried out by using the PSTN 221 and the communication protocol of T.30, and the communication ended normally when the communication was carried out by using the LAN 223 and the communication protocol of T.37S (electronic mail).

When outputting of the communication management information is indicated, for example, by the user indicating from an operation unit (not shown in the drawings), the control unit 211 fetches the communication management information stored in the storage unit 213. The control unit 211 converts at least the communication result information such that the information becomes independent of the communication channel or the communication protocol. Then, the converted communication result information is printed out by the printing unit 216. FIG. 11 is a view showing an example of the output result of the communication management information. The communication of the number "2" shown in the second and the third lines failed in the first communication, and succeeded in the communication by carrying out re-communication, as shown in FIG. 10. In such a case, "OK" is written as the communication result. Moreover, the communication of the number "3" shown in the fourth and the fifth lines have failed in the two communication management information shown in FIG. 10. Therefore, an error code is shown as the communication result. In such a case, for example, the error code corresponding to the detailed information as shown in FIG. 7 is used. Accordingly, the error codes that are independent of the communication channel or the communication protocol can be provided to the user.

As described above, the user can carry out the communication without being conscious about which communication channel and communication protocol is used during the communication. Therefore, it is preferable for the communication management information presented to the user to be also independent of the communication channel and the communication protocol. As shown in FIG. 11, also in the third embodiment, the communication management information presented to the user is in a form independent of the communication channel and the communication protocol. This satisfies the request that the communication management information presented to the user is independent of the communication channel and the communication protocol. In addition, when the communication management information as shown in FIG. 10 is presented to the user, even in the case the user wishes to know about the result of the indicated communication, the user is required to search from many information. Such a process is complicated for the user. However, by outputting the communication management information as shown in FIG. 11, the user can be presented with the communication management information that can be easily understood.

Further, the contents of the communication management information to be stored in the storage unit 213 shown in FIG. 10, and the output form of the communication management information shown in FIG. 11 are just an example. Other various forms can be adopted. In addition, the configuration shown in FIG. 9 shows an example in which the printing unit 216 is included as an outputting device of the communication management information. FIG. 11 shows an example of the case in which the communication management information is printed out. However, the present invention is not limited to these examples, and for example, the communication management information can be displayed, or can be output to an outside machine from the interface or the communication unit 212.

According to the third embodiment, the storage unit 213 stores detailed communication management information. Therefore, when a maintenance worker or an administrator requests to obtain the information relating to the communication channel or the communication protocol, the presentation of the communication management information according to the request can be made.

What is claimed is:

1. A communication device comprising:
   a communication unit that carries out communications via a plurality communication channels and a plurality of communication protocols;
   a storage unit storing
      ability management information that registers a plurality of groups of specifying information for specifying another communication device, a communication channel and a communication protocol used by the other communication device, and identification information used in the communication channel and the communication protocol, and
      communication management information including communication result information that is independent of the communication channel and the communication protocol used during the communication; and
   a controller for selecting the communication channel, the communication protocol, and the identification information corresponding to the specifying information of a receiving communication device, from registered information within an ability management table, and for carrying out the communication by the communication unit, and wherein the controller forms the communication management information for each communication and has the formed communication management information held by the storage unit.

2. The communication device according to claim 1, wherein the controller selects registered information from a plurality of registered information corresponding to the specifying information in accordance with a prescribed priority order.

3. The communication device according to claim 2, wherein the prescribed priority order is an order of ascending communication costs.

4. The communication device according to claim 2, wherein the prescribed priority order is an order of decreasing communication speed.

5. The communication device according to claim 2, wherein the prescribed priority order can be registered in the ability management table.

6. The communication device according to claim 2, wherein the controller selects registered information next in order based on the prescribed priority order and carries out a communication when an initial communication fails using the registered information selected based on the prescribed priority order.

7. The communication device according to claim 1, wherein the ability management table further registers information relating to a receiving ability of each of the communication devices or for each communication channel and communication protocol of the communication device, and the controller selects the registered information registered with information relating to the receiving ability most suitable in the communication, when there is a plurality of registered information corresponding to the receiving communication device in the ability management table.

8. The communication device according to claim 1, wherein the controller searches from the ability management table, a relay communication device that can carry out a communication by the communication channel and the communication protocol that can be communicated by the communication unit and the receiving communication device, indicates the searched relay communication device to relay the communication to the receiving communication device, and carries out the communication with the relay communication device.

9. The communication device according to claim 8, wherein the controller selects registered information from a plurality of registered information based on a prescribed priority order when there is a plurality of registered information corresponding to the relay communication device in the ability management table.

10. The communication device according to claim 9, wherein the prescribed priority order is an order of ascending communication costs.

11. The communication device according to claim 9, wherein the prescribed priority order is an order of decreasing communication speed.

12. The communication device according to claim 9, wherein the prescribed priority order can be registered in the ability management table.

13. The communication device according to claim 9, wherein the controller selects the registered information next in order based on the prescribed priority order, and carries out a communication when an internal communication fails using the registered information selected in the priority order.

14. The communication device according to claim 8, wherein the ability management table can further register information related to a receiving ability for each communication device or for each communication channel and communication protocol of the communication device , and the controller selects the registered information registered with information relating to the receiving ability most suitable in the communication, when there is a plurality of registered information corresponding to the relay communication device in the ability management table.

15. The communication device according to claim 1, wherein the controller includes a function for carrying out re-communication by using an alternative communication channel or communication protocol in the case of a failure in the communication using certain communication channels and communication protocol, and forms one communication management information for a first communication and for one or a plurality of times of re-communications.

16. The communication device according to claim 1, wherein the controller forms one communication management information when the communication is indicated for a plurality of destinations and the communication is carried out by using a plurality of communication channels or a plurality of communication protocols.

17. A communication device comprising:
   a communication unit that carries out communications via a plurality communication channels and a plurality of communication protocols;
   a storage unit storing ability management information that registers a plurality of groups of specifying information for specifying another communication device, a communication channel and a communication protocol used by the other communication device, and identification information used in the communication channel and the communication protocol; and
   a controller for selecting the communication channel, the communication protocol, and the identification information corresponding to the suecifying information of a receiving communication device, from registered information within an ability management table, and for carrying out the communication by the communication unit, wherein:
   the storage unit stores communication management information;
   an outputting unit outputs information;
   the controller forms the communication management information for each communication and has the formed communication management information held by the storage unit; and
   when the communication management information is output by the outputting unit, the control unit converts the communication management information into output information including communication result information independent of the communication channel and the communication protocol used during the communication.

* * * * *